Patented Apr. 6, 1943

2,315,965

UNITED STATES PATENT OFFICE 2,315,965

INSECTICIDE AND METHOD OF USING

William A. Knapp, New York, N. Y., assignor to General Chemical Company, New York, N. Y., a corporation of New York No Drawing. Application January 1, 1942, Serial No. 425,344

8 Claims. (Cl. 167—30)

This invention relates to insecticides. It is particularly directed to a new class of insecticidal compounds for combatting insects, especially insects susceptible to control by stomach poison insecticides, notably the chewing insects, such as the larvae of moths and butterflies, larval and adult beetles, grasshoppers and crickets; insects which feed on exposed liquids and solids such as the house fly and fruit flies; and insects, such as thrips, which lacerate the epidermis of plants and suck up the exuding sap.

In accordance with the present invention it has been found that dihydroanthracenes having the general formula:

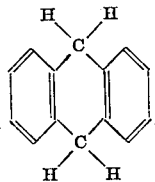

possess insecticidal properties against insects of the above type.

The dihydroanthracenes include the compound dihydroanthracene and the corresponding compounds in which one or more of the hydrogens thereof has been replaced by an element or radical such as for example a methyl, bromo, or chloro substituent.

The insecticides of the present invention may be applied to the host, e. g. fruit or foliage, or to other food of the insect to be combatted. They are compatible with and therefore may be used in combination with other stomach insecticides, contact insecticides, fungicides, and supplementary materials such as hydrated lime, diluents, sticking, spreading, and wetting agents, etc., commonly used in combination with insecticides. They may be used dispersed in liquids or dispersed in dry form as dusts.

The compounds of the present invention are relatively stable under the usual conditions of use. They possess very low solubility in water and hence are not easily removed from fruit or foliage by rain. The compounds of this invention are believed to be relatively harmless, compared with the arsenates for example, to warm-blooded animals.

The insecticidal effectiveness of dihydroanthracene is applicable not only to insects in active state but also to their eggs, as indicated by the following examples. This property is of especial importance in combatting codling moths since a single application of the material serves at once as a contact ovicide to arrest the development of the codling moth eggs with which it comes in contact and also to provide a stomach poison deposit lethal to codling moth larvae which may come later.

The invention will be illustrated by the following examples:

Example 1

Dihydroanthracene was applied in the form of a solution comprising 1 gram of dihydroanthracene per 100 cc. of acetone. Each of five apples was sprayed with between 15 and 20 cc. of this solution and allowed to dry. At the same time five apples were sprayed with acetone free from dihydroanthracene and also allowed to dry. Each of the ten apples was then infested with five newly hatched codling moth larvae.

After 8 to 10 days the apples were examined to determine the number of larvae surviving. The percentage control expressed as the value of $100(X-Y)/X$, where X equals the percentage survival on the check and Y equals the percentage survival on the dihydroanthracene treated apples, was 100%.

Example 2

Dihydroanthracene was applied in the form of an aqueous suspension comprising the insecticide in the proportion of 4 pounds per 100 gallons of water. Each of five apples was sprayed with 15 to 20 cc. of this dispersion and allowed to dry. At the same time five apples were sprayed with water alone and also allowed to dry. Each of these ten apples was then infested with five newly hatched codling moth larvae.

After 8 to 10 days the apples were examined to determine the number of larvae surviving. The percentage control in this example was approximately 90%.

Example 3

Ten codling moth eggs between 12 and 24 hours old were placed on each of four apples. The apples were then sprayed with a suspension of 4 pounds of dihydroanthracene per 100 gallons of water to provide a medium even coating on the surface of the apples. The apples were stored at about 94° F. and 50 to 52% relative humidity for ten days and then examined to determine the number of eggs which had hatched. A simultaneous check was run with 10 eggs on each of four apples free from dihydroanthracene. None of the eggs hatched in the case of the dihydroanthracene-treated apples as against twenty in the case of the check.

I claim:

1. An insecticide comprising as an active insecticidal ingredient a dihydroanthracene.

2. An insecticide comprising as an active insecticidal ingredient the compound dihydroanthracene.

3. A stomach insecticide comprising as an active insecticidal ingredient a dihydroanthracene.

4. A codling moth ovicide and larvicide comprising as an active insecticidal ingredient the compound dihydroanthracene.

5. The method of combatting chewing insects which comprises applying to the food of the insect a dihydroanthracene.

6. The method of combatting chewing insects which comprises applying to the insect host a dilute aqueous dispersion of the compound dihydroanthracene.

7. The method of combatting codling moth larvae which comprises applying a dihydroanthracene to the host.

8. The method of combatting codling moth upon pome fruit plants, which comprises applying to the host and to codling moth eggs thereon a dilute aqueous dispersion containing the compound dihydroanthracene.

WILLIAM A. KNAPP.